United States Patent
Sheem et al.

(10) Patent No.: US 8,440,352 B2
(45) Date of Patent: May 14, 2013

(54) NEGATIVE ACTIVE MATERIAL FOR LITHIUM SECONDARY BATTERY AND NEGATIVE ELECTRODE AND LITHIUM SECONDARY BATTERY COMPRISING SAME

(75) Inventors: Kyou-Yoon Sheem, Yongin-si (KR); Sang-Jin Kim, Yongin-si (KR); Joon-Sup Kim, Yongin-si (KR); Sung-Soo Kim, Yongin-si (KR); Yoshiaki Nitta, Yongin-si (KR); Sang-Min Lee, Yongin-si (KR); Han-Su Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 13/328,888

(22) Filed: Dec. 16, 2011

(65) Prior Publication Data

US 2012/0094175 A1 Apr. 19, 2012

Related U.S. Application Data

(62) Division of application No. 12/831,876, filed on Jul. 7, 2010, now Pat. No. 8,110,168, which is a division of application No. 11/104,871, filed on Apr. 12, 2005, now Pat. No. 7,781,103.

(30) Foreign Application Priority Data

Apr. 12, 2004 (KR) .................. 10-2004-0024867
Apr. 14, 2004 (KR) .................. 10-2004-0025768

(51) Int. Cl.
*H01M 4/583* (2010.01)
*H01M 4/587* (2010.01)
*C01B 31/00* (2006.01)
*C01B 31/02* (2006.01)
*C01B 31/08* (2006.01)

(52) U.S. Cl.
USPC .................. 429/231.8; 423/414; 423/445 R; 252/182.1

(58) Field of Classification Search .............. 423/445 R, 423/414; 429/231.8; 252/182.1
See application file for complete search history.

(56) References Cited

U.S. PATENT DOCUMENTS 5,028,500 A  7/1991  Fong et al.
5,250,491 A  10/1993  Yan
(Continued)

FOREIGN PATENT DOCUMENTS

CN  1214554 A  4/1999
CN  1228619 A  9/1999
(Continued)

OTHER PUBLICATIONS

Japanese Office action dated Feb. 2, 2011, for corresponding Japanese Patent application 2006-112407.

(Continued)

*Primary Examiner* — Gregg Cantelmo
(74) *Attorney, Agent, or Firm* — Christie, Parker & Hale, LLP (57) ABSTRACT

A negative electrode for a lithium secondary battery of the present invention includes a negative active material including a plate-shaped carbon powder particle agglomerated in a primary structure in which the plate-shaped particle is oriented in a plane direction and laminated. Fine carbon powder particles are then agglomerated to form a secondary structure on the surface of the primary structure such that the resulting particles include fine pores formed on the surface.

10 Claims, 3 Drawing Sheets

U.S. PATENT DOCUMENTS

| | | |
|---|---|---|
| 6,030,726 A | 2/2000 | Takeuchi et al. |
| 6,342,319 B1 | 1/2002 | Kuboki et al. |
| 6,395,427 B1 | 5/2002 | Sheem et al. |
| 6,432,583 B1 | 8/2002 | Fukuda et al. |
| 2004/0137328 A1 | 7/2004 | Kim et al. |
| 2005/0014067 A1 | 1/2005 | Tenno et al. |

FOREIGN PATENT DOCUMENTS

| | | |
|---|---|---|
| CN | 1301048 A | 6/2001 |
| CN | 1301052 A | 6/2001 |
| JP | 04368778 A | 12/1992 |
| JP | 05275076 A | 10/1993 |
| JP | 9-12308 A | 1/1996 |
| JP | 8-321306 A | 12/1996 |
| JP | 10-334915 | 12/1998 |
| JP | 11-219700 A | 8/1999 |
| JP | 2000-058052 A | 2/2000 |
| JP | 2000-340232 | 12/2000 |
| JP | 2001-185149 A | 7/2001 |
| JP | 2002-154814 A | 5/2002 |
| JP | 2004063321 A | 2/2004 |

OTHER PUBLICATIONS

Patent Abstracts of Japan, and English machine translation of Japanese publication 10-334915, listed above.

Uchiyama, T., et al., *Sphericity of Natural Carbon Graphite by Means of Dry Impact Blending*, Hokkaido Industrial Test Report, No. 301, (2002), pp. 163-166, with English translation.

NEGATIVE ACTIVE MATERIAL FOR LITHIUM SECONDARY BATTERY AND NEGATIVE ELECTRODE AND LITHIUM SECONDARY BATTERY COMPRISING SAME

CROSS-REFERENCES TO RELATED APPLICATION

This application is a divisional of U.S. patent application Ser. No. 12/831,876 filed Jul. 7, 2010, now U.S. Pat. No. 8,110,168, which is a divisional of U.S. patent application Ser. No. 11/104,871, filed Apr. 12, 2005, now U.S. Pat. No. 7,781,103, which claims the benefit of and priority to Korean Patent Application Nos. 10-2004-0024867 and 10-2004-0025768 filed on Apr. 12, 2004 and Apr. 14, 2004, respectively, in the Korean Intellectual Property Office, the entire disclosures of which are incorporated herein by reference.

FIELD OF THE INVENTION

The present invention relates to a negative active material for a lithium secondary battery, and a negative electrode and a lithium secondary battery comprising the same. It more particularly relates to a negative active material for a lithium secondary battery having good compression strength, wettability for an electrolyte, and discharge characteristics at a low temperature, and that is capable of providing a high density electrode plate, and a negative electrode and a lithium secondary battery comprising the same.

BACKGROUND OF THE INVENTION

Lithium secondary batteries comprise a positive electrode and a negative electrode comprising materials capable of reversibly intercalating lithium ions, with an organic electrolyte or a polymer electrolyte injected between the positive electrode and the negative electrode. The battery produces electrical energy as a result of a redox reaction upon intercalating/deintercalating the lithium ions.

The positive active material for the lithium secondary battery employs a chalcogenide compound such as a metal composite compound of $LiCoO_2$, $LiMnO_2$, $LiMn_2O_4$, $LiNiO_2$, or $LiNi_{1-x}Co_xO_2$ (where $0<x<1$).

The negative active material typically comprises a lithium metal, but a battery short circuit may occur in a battery using such a material as the negative active material due to dendrite formation. Therefore, the lithium metal may be substituted with a carbonaceous material. Crystalline carbon such as natural graphite or synthetic graphite and amorphous carbon such as soft carbon or hard carbon have been mentioned for this purpose. While amorphous carbon has a very large capacity, it may cause problems in that it is hard to reverse intercalation during the charge and the discharge. Crystalline carbon, when used for the negative active material, is generally in the form of a natural graphite since it has a high capacity with a theoretical limit capacity of 372 mA h/g, but it has a problem in that the cycle life of the resultant battery is remarkably degenerated.

The negative active material for a negative electrode for a lithium secondary battery is prepared by mixing carbon materials and a binder, and a conductive agent if required, and agitating them to provide a slurry. Then, the slurry is coated on a metal current collector and dried to form a negative electrode. The negative active material is further compressed onto the current collector in order to obtain a uniformly thick electrode plate and increase the capacity of the electrode plate. However, the carbon material tends to crack upon compressing the electrode plate, so the electrode plate may lose its uniformity, which causes the reaction with the electrolyte to lose uniformity and the life of the electrolyte plate to degenerate. Furthermore, if a crack develops, an edge portion thereof is exposed by the pulverized crack so as to increase a side reaction with the electrolyte, and the viscosity of the electrolyte is remarkably increased at a low temperature such as −20° C. because the electrolyte is soaked into the fine cracks by capillary action and the electrolyte taking part in the battery reaction is decreased. Thereby, the discharge characteristic at the low temperature is degenerated.

SUMMARY OF THE INVENTION

In one embodiment of the present invention, a negative active material is provided for a lithium secondary battery capable of providing an electrode plate having a high density and a good compression strength of the particle, a negative electrode, and a lithium secondary battery comprising the same.

In an embodiment of the present invention, a negative active material comprises a plurality of negative active material particles, each including a plurality of plate-shaped carbon powder particles agglomerated in a primary structure in which the plate-shaped particles are oriented in a plane direction and laminated to one another with fine pores formed on the surface of the negative active material particle.

In still another embodiment of the present invention, a negative electrode for a lithium secondary battery comprises such a negative active material.

In yet another embodiment of the present invention, a lithium secondary battery is provided comprising the negative electrode.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE EMBODIMENTS

Figure 1:
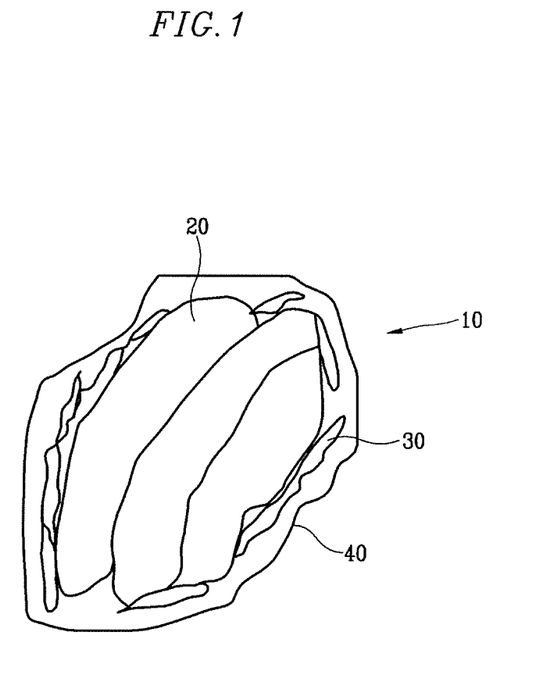
FIG. 1 is a schematic view showing a structure of the negative active material for the negative electrode plate according to the present invention.

As shown in FIG. 1, according to an embodiment of the invention, a negative active material is provided that comprises a plurality of negative active material particles 10. Each negative active material particle comprises a plurality of plate-shaped carbon powder particles 20 agglomerated in a primary structure in which the plate-shaped carbon powder particles are oriented in a plane direction and laminated to one another. Fine pores are formed on the surface of the plate-shaped carbon powder particles. Additional fine carbon powder particles 30 may be agglomerated to form a secondary structure on the surface of the plate-shaped carbon powder particles.

The plate-shaped carbon powder particles are formed in a primary structure in which the plate-shaped carbon powder particles are oriented in a plane direction and laminated to one another, whereby each particle is reflected by a different polarization. The negative active material particles are preferably of a spherical or pseudo-spherical shape. The plate-shaped carbon powder particles are of natural or synthetic graphite with an average particle size of 10 μm or more, and more preferably between 15 and 25 μm. The plate-shaped carbon powder particles preferably have an intensity ratio of the (110) plane/(002) plane of 0.2 or less, and more preferably 0.002 to 0.2, determined by X-ray diffraction.

The fine carbon powder particles are pulverized particles generated while pulverizing the plate-shaped carbon powder particles, and have an average length or an average particle size of 5 μm or less, and preferably between 0.5 and 3 μm. The fine carbon powder particles may be formed as fibers, amorphous shapes, flake shapes, or other shapes. The average particle size is measured using a particle size analyzer (Marvern.2000) after dispersing the carbon powder particles in solvent using ultra-sonication.

The fine carbon powder particles may have an amorphous or a turbostratic structure in part or as a whole. The fine carbon powder particles are formed into an agglomerated body on the plate-shaped carbon powder particles to obtain a high density negative active material having fine pores on its surface. As a result of the fine pores, the absolute amount of conservation of electrolyte is increased, and thereby the high rate characteristics and the low temperature characteristics are improved. According to the prior art, when the fine pores are present in the whole of the active material, it is easily compressed upon preparing a high density electrode plate and the specific surface of the active material in the electrode plate is increased, causing new edge faces to be projected which brings about a side reaction with the electrolyte. However, according to the present invention, as the pores are present only on the surface of the negative active material particles, they are not easily broken even during compression in forming an electrode plate, and the shapes of the negative active material particles are maintained. Thereby, side reactions with the electrolyte are prevented and an electrode plate having good swelling suppression characteristics may be fabricated.

Referring to FIG. 1, the carbon powder particle may further comprise an amorphous carbon coating layer 40 other than the fine carbon powder particle layer on the surface thereof. In one embodiment of the invention, the amorphous carbon coating layer 40 is present in a range of 5 to 30 parts by weight, and preferably 5 to 15 parts by weight based on 100 parts by weight of the carbon powder particle.

The negative active material particles according to one embodiment of the present invention have ratios of major axes to minor axes of 4 or less, preferably from 1 to 3. In an embodiment of the invention, the fine porosity ratio of the negative active material occupied by the pores having a diameter of 0.5 μm or less is 10% to 40%, preferably 15% to 40%, and more preferably 10% to 35%. In another embodiment of the invention, the fine porosity ratio of the negative active material occupied by the pores having diameter of 0.1 μm or less is 12% or less, and preferably from 3% to 10%.

Even though the fine porosity of the electrode plate is generally reduced more than that of the active material during the compression step of the electrode plate, the fine porosity of the active material according to the present invention is 2.0 times or less, preferably 1.1 to 1.5 times that of the electrode plate showing that the fine porosity of the active material is almost not changed after the compression step.

The pores having a diameter of 10 to 100 μm act to improve the speed of absorption of the electrolyte and the speed of transporting the lithium ions in the electrode plate applied with the negative active material. If the electrode plate is formed of a conventional carbon material, the porosity area occupied by the pores of 10 to 100 μm is remarkably less. In the present invention, since the porosity area occupied by the pores having a diameter of 10 to 100 μm is 30 to 60%, preferably 35 to 50%, it is advantageous with respect to conserving the electrolyte, assuring the fluid pathway, and improving the lithium ion transport and the low temperature discharge characteristics.

According to an embodiment of the present invention, the negative active material is a high density carbon material having a tap density of 1.0 g/cc or more, preferably 1.1 to 1.30 g/cc, and an apparent density of 0.6 to 1.0 g/cc. Further, the ratio of the tap density to the apparent density is 130% or more.

According to an embodiment of the invention, the specific area determined by the BET method ranges from 2.0 $m^2$/g to 4.0 $m^2$/g. As the compression strength of the negative active material is 15 MPa or more, and preferably from 15 to 45 MPa, the active material is rarely damaged during the compression step of the electrode plate.

Hereinafter, the method of producing the negative active material is described in detail.

Initially, edge parts or protruded parts of the carbon material are removed by a first mechanic dynamic pulverizing process to obtain a spherical or a pseudo-spherical material. The carbon material may be a natural graphite, a synthetic graphite, a graphite precursor, or similar materials. The graphite precursor may be a graphite carbon fiber, a graphite mesocarbon microbead (MCMB), or similar materials.

During the first mechanical-dynamic pulverization process, as the carbon material is formed into the spherical or the pseudo-spherical shaped particles, the plate-shaped carbon powder particles are obtained. During this process, the fine carbon powder particles are also obtained. At the same time, small cracks are generated between crystalline granules having a certain directional orientation inside the carbon material, and thereby the orientation of crystalline granule is totally shifted. Also, fluidity among the crystalline granules is ensured by generating the cracks because of fine particle impurities present therein.

According to an embodiment of the present invention, the carbon material is subsequently agglomerated with the fine carbon powder particles via a second mechanical-dynamic pulverizing process by applying a very strong friction force and a shearing force between surfaces thereof. During the second agglomerating process, the plate-shaped carbon powder particles are oriented in a plane direction and laminated. By the very strong friction stress between surfaces, the Van der Waals force between plane surfaces is maximized and interlocking is maximally generated. The plate-shaped carbon powder particles are then dried and agglomerated to form a multi-laminated spherical or pseudo-spherical powder. The fine carbon powder particles are secondary-agglomerated on the surface of the plate-shaped carbon powder particles in a structure such that the fine carbon powder particles coat the surface of the plate-shaped carbon powder particles. At this time, the fine carbon powder particles are agglomerated in a random direction while forming fine pores. The agglomerating processes according to the present invention are carried out in a dry atmosphere.

The mechanical-dynamic pulverizing process utilizes forces such as compression, impact, shear, and friction. The pulverizing process generally utilizes all of these four forces, and is not limited to a particular force or forces, but it is dependant upon the design characteristics or the driving conditions of the device. The smoothing process on the particle surface is carried out by the first mechanic operation mainly using a force generated by compression and impact. Representative examples of pulverization devices include rotor mills, ACM mills, pin mills, and jet mills. For the second agglomeration and attachment of the fine carbon powder particles to the surface, the device applying the shearing force and the compression friction force may implement mechanofusion, hybridization, and so on.

The second agglomerating process may further comprise the step of adding the fine carbon powder particles. Further, the second agglomerating process may comprise the step of adding an amorphous carbon precursor to agglomerate the fine carbon powder particles with the plate-shaped carbon powder particles. Suitable amorphous carbon precursors include mesophase pitch, petroleum-based pitch, carboniferous pitch, and heavy grade oil having a low molecular weight. Such amorphous carbon precursors may be added in an amount of 5 to 30 parts by weight based on 100 parts by weight of carbon materials.

The agglomerated body obtained from the aforementioned processes is subjected to heat treatment to provide a negative active material according to the present invention. The heat treatment process is carried out at 1000° C. or more, preferably 1200 to 2400° C. If the heating treatment is carried out at less than 1000° C., the impurity hetero atoms are not completely removed.

According to one embodiment of the present invention, a negative electrode plate is provided comprising the above-described negative active material. The negative electrode plate is obtained by coating a slurry comprising a negative active material and a binder resin on a metal current collector, and drying and compressing the same.

As the negative active material according to the present invention has a high density and a high compression intensity, it is possible to obtain a high density electrode plate of 1.5 g/cc to 2.0 g/cc, preferably 1.8 to 2.0 g/cc. According to the present invention, even though such a high density electrode plate is applied to the battery, it is possible to provide a high capacity battery since sufficient pathways for absorbing the electrolyte are maintained.

The binder resin can be selected from any binder resin used for a conventional lithium secondary battery. Examples include polyvinylidene fluoride, carboxymethyl cellulose, methyl cellulose, and sodium polyacrylic acid. The metal current collector may include a punching metal, a mesh punching metal, gold foil, a metal foam, a net metal fiber sinter, a nickel foil, or a copper foil.

Further, the negative electrode according to an embodiment of the present invention may further comprise a conductive agent such as a nickel powder, cobalt oxide, titanium oxide, or carbon. The carbon may include ketjen black, acetylene black, furnace black, graphite, carbon fiber, or fullerene.

According to another embodiment of the present invention, the lithium secondary battery comprises the aforementioned negative electrode plate. The lithium secondary battery may comprise negative and positive electrodes, an electrolyte, and if required, a separator.

The positive electrode of the lithium secondary battery may be any positive electrode used for a conventional lithium secondary battery, e.g., one prepared by mixing a positive active material powder with a binder and a conductive agent and forming it into a paste or a sheet shape.

Suitable positive active materials are those selected from the group consisting of $LiMn_2O_4$, $LiCoO_2$, $LiNiO_2$, $LiFeO_2$, and $V_2O_5$. In an embodiment of the invention, it is preferred that the positive active material be capable of intercalating lithium. Examples of such materials include TiS, MoS, organic disulfide compounds, or organic polysulfide compound. Examples of the conductive material include ketjen black, acetylene black, furnace black, graphite, carbon fiber, and fullerene. Suitable binders include polyvinylidene fluoride, carboxymethyl cellulose, methylcellulose, sodium polyacrylic acid.

A positive electrode is obtained by mixing a slurry comprising positive active material powder, a binder, and a conductive agent, coating and drying it on the metal current collector, and compressing it to form a desired shape.

The separator may be any single- or multi-layer conventional separator used for a lithium secondary battery, and it may include, for example, polyethylene, polypropylene, polyvinylidene fluoride, polyamide, and glass fiber.

The electrolyte for the lithium secondary battery may include any organic electrolyte in which a lithium salt is dissolved in a non-aqueous solvent.

The non-aqueous solvent may include ethylene carbonate, propylene carbonate, butylene carbonate, benzonitrile, acetonitrile, tetrahydrofuran, 2-methyltetrahydrofuran, butyrolactone, dioxolane, 4-methyldioxolane, N,N-dimethylformamide, dimethylacetoamide, dimethylsulfoxide, dioxane, 1,2-dimethoxy ethane, sulforane, dichloroethane, chlorobenzene, nitrobenzene, dimethyl carbonate, methylethyl carbonate, diethyl carbonate, methylpropyl carbonate, methylisopropyl carbonate, ethylbutyl carbonate, dipropyl carbonate, diisopropyl carbonate, dibutyl carbonate, diethylene glycol, dimethyl ether, and mixtures thereof. Further, it may include any conventional solvent used for a lithium secondary battery. It is preferably a mixture of any one of propylene carbonate, ethylene carbonate, and butyl carbonate with any one of dimethyl carbonate, methylethyl carbonate, and diethyl carbonate.

The lithium salt may include, but is not limited to, one or a mixture of two or more selected from the group consisting of $LiPF_6$, $LiBF_4$, $LiSbF_6$, $LiAsF_6$, $LiCF_3SO_3$, $Li(CF_3SO_2)_3$, $Li(CF_3SO_2)_2N$, $LiC_4F_9SO_3$, $LiClO_4$, $LiAlO_4$, $LiAlCl_4$, $LiN(C_xF_{2x+1}SO_2)(C_yF_{2y+1}SO_2)$ (where x and y are natural numbers), LiCl, and LiI.

Further, the electrolyte may include a polymer electrolyte comprising the organic electrolyte and a polymer such as polyethylene oxide, polypropylene oxide, polyacetonitrile, polyvinylidene fluoride, polymethacrylate, or polymethylmethacrylate, which add good swelling properties to the organic electrolyte.

Figure 2:
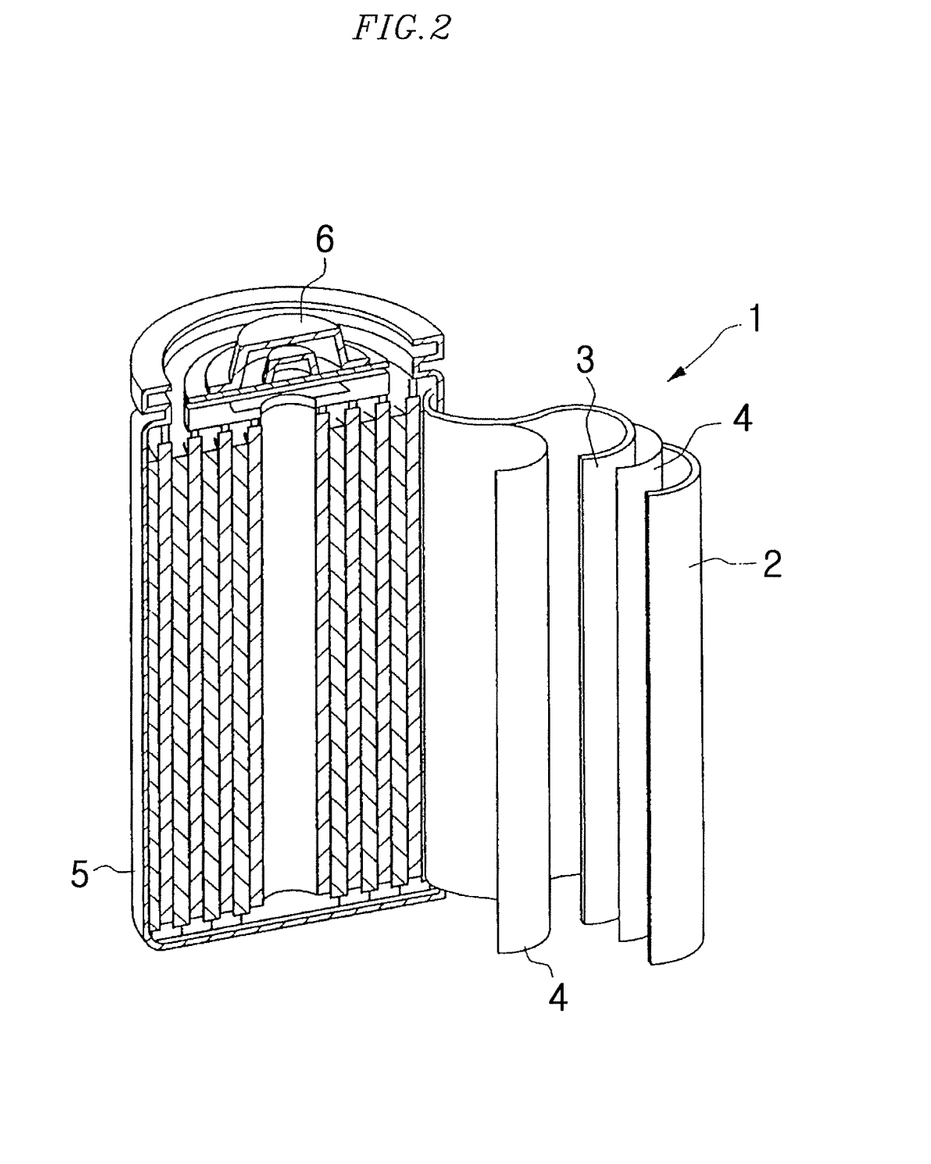
FIG. 2 is a view showing one embodiment of the lithium secondary battery.

A lithium secondary battery is fabricated by inserting the negative electrode, the positive electrode, the electrolyte, and if required, the separator into the battery case. FIG. 2 shows a perspective view of the lithium secondary battery 1 according to one embodiment of the present invention. The lithium secondary battery 1 is formed in a cylindrical shape and is mainly composed of a negative electrode 2; a positive electrode 3; a separator 4 placed between the negative electrode 2 and the positive electrode 3; an electrolyte injected in the negative electrode 2, the positive electrode 3, and the separator 4; a cylindrical battery container 5; and a sealing member 6 sealing the battery container 5. In the lithium secondary battery 1, the negative electrode 2, the positive electrode 3, and the separator 4 are laminated in order, then wound in a spiral shape and inserted in the battery container 5.

The following examples further illustrate the present invention in detail, but are not to be construed to limit the scope thereof.

EXAMPLES AND COMPARATIVE EXAMPLES

Example 1

Plate-shaped graphite powder particles having an average diameter of 30 μm were introduced into a pin mill and preliminarily pulverized. The projected and edge parts of the plate-shaped graphite powder particles were removed to form an agglomerated body having a spherical or a pseudo-spherical shape. The resulting plate-shaped graphite powder particles were then introduced to a mechanofusion process and further pulverized. The plate-shaped graphite powder particles were oriented in a plane direction and laminated, and then fine graphite powder particles were placed on the surface of the plate-shaped graphite powder particles to obtain a second agglomerated carbon material that was heat treated at 1000° C.

The resulting negative active material was mixed with 6 parts by weight of polyvinylidenefluoride (PVdF) as a binder and dispersed in N-methylpyrrolidone to produce a slurry for a negative electrode. The slurry was coated on a copper current collector and compressed by a roll press, thereby manufacturing a negative electrode having an electrode plate density of 1.5 g/cc, 1.6 g/cc, 1.65 g/cc, 1.85 g/cc, and 2.0 g/cc.

Using the negative electrode and lithium metal as a counter electrode, coin-type half cells were fabricated. A mixed solution of 1.0M $LiPF_6$ dissolved in ethylene carbonate, dimethyl carbonate and ethyl methyl carbonate (in a 3/3/4 volume ratio) was used for the electrolyte.

Example 2

A cell was prepared in the same manner as in Example 1, except that the second agglomerated body was obtained by adding 10 parts by weight of mesophase pitch based on 100 parts by weight of the agglomerated body obtained in Example 1.

Comparative Example 1

A cell was prepared in the same manner as in Example 1, except that the negative active material was obtained by mixing natural graphite powder particles, pitch, and a graphitizing catalyst having an average diameter of 15 μm with silica, and shaping the mixture, pulverizing the mixture, and carbonizing or graphitizing the resultant agglomerated amorphous particles to produce graphite agglomerated particles as the negative active material.

Comparative Example 2

A cell was prepared in the same manner as in Example 1, except that the negative active material was obtained by mixing carbonized coke particles, pitch, and a graphitizing catalyst with silica and shaping and pulverizing the mixture to an amorphous coarse body. Then, the amorphous particle was carbonized or graphitized by subjecting it to the high temperature treatment.

Comparative Example 3

A cell was prepared in the same manner as in Example 1, except that the negative active material was amorphous artificial graphite.

Compression strengths of the negative active materials according to Examples 1 and 2 and Comparative Examples 1 to 3 were measured and the results are shown in Table 1. The compression strength was measured as follows: negative active material particles were layered in one layer and compressed by application of pressure and the point at which particle fracture occurred was measured.

Further, the cells obtained from Examples 1 and 2 and Comparative Examples 1 to 3 were charged to 0.2 C at room temperature a under constant current and constant voltage condition. The initial discharge capacity and charge-discharge efficiency according to electrode plate density were measured. The results are shown in Table 1.

TABLE 1

|  |  | Example 1 | Example 2 | Comparative Example 1 | Comparative Example 2 | Comparative Example 3 |
|---|---|---|---|---|---|---|
| Compression strength of active material particles (MPa) |  | 30 | 35 | 7 | 12 | 12 |
| initial discharge capacity according to electrode plate density (charge-discharge efficiency) | 1.8 g/cc | 350 mAh/g (92%) | 352 mAh/g (94%) | 340 mAh/g (92%) | 346 mAh/g (92%) | 330 mAh/g (92%) |
|  | 2.0 g/cc | 340 mAh/g (91%) | 348 mAh/g (91%) | 310 mAh/g (84%) | 324 mAh/g (88%) | 315 mAh/g (90%) |

As shown in Table 1, the compression strength of the negative active material particles of Examples 1 and 2 was significantly improved over those of Comparative Examples 1 to 3. Therefore, the active material of Examples 1 and 2 ensure a sufficient penetration pathway of electrolyte in a high density electrode plate. This is confirmed by the fact that when comparing discharge capacity of cells including a high density electrode plate of over 1.8 g/cc, initial discharge capacities and efficiencies of Examples 1 and 2 were higher than those of Comparative Examples 1 to 3.

Figure 3:
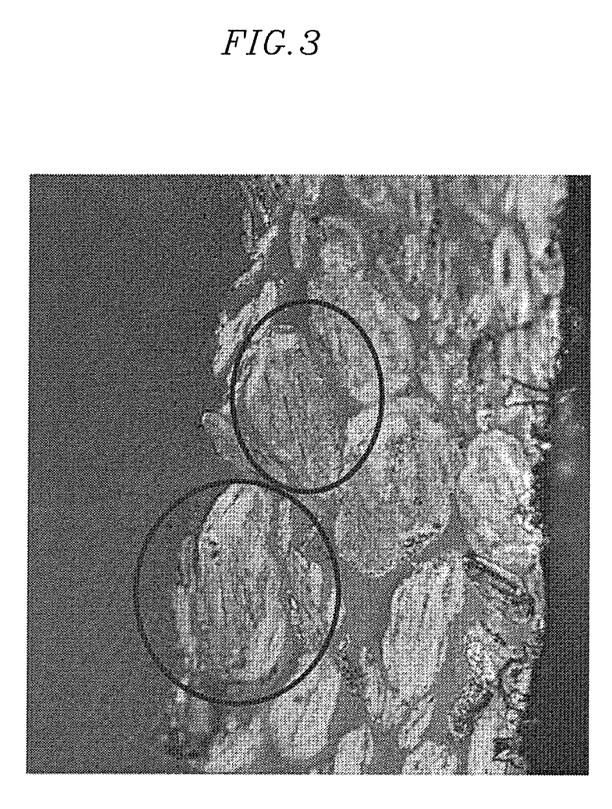
FIG. 3 is a picture showing a cross-section of a negative electrode fabricated using the negative active material according to Example 1.

The negative electrode plate of Example 1 was molded using an epoxy resin and cut, thereby facilitating inspection of a cross-section thereof. FIG. 3 is a photograph taken of the plate with an optical microscope, showing one particle of the active material which indicates various plate-shaped layers with circles.

Example 4

After mixing 94 parts by weight of $LiCoO_2$ as a positive active material, 2 parts by weight of polyvinylidenefluoride (PVdF) as a binder, and 4 parts by weight of super-P conductive agent, a positive slurry was prepared by dispersing the mixture into N-methylpyrrolidone. The slurry was coated on an aluminum foil and compressed with a roll press, thereby manufacturing a positive electrode having an active mass (active material layer) density of 3.4 g/cc.

A polyethylene separator was interposed between the positive electrode prepared above and a negative electrode with an electrode plate density of 1.60 g/cc as prepared in Example 1 to fabricate an electrode group. The manufactured electrode group was wound and pressed, then put into a battery case. An electrolyte was injected into the case to form a battery. A mixed solution of 1.0M LiPF6 dissolved in ethylene carbonate, dimethyl carbonate and ethyl methyl carbonate (in a volume ratio of 3/3/4) was used for the electrolyte.

Example 5

A cell was prepared in the same manner as in Example 4, except that the second agglomerated body was obtained by adding 10 parts by weight of mesophase pitch based on the 100 parts by weight of the agglomerated body obtained in Example 4.

Comparative Example 4

A cell was prepared in the same manner as in Example 4, except that the negative active material was obtained by mixing natural graphite particles, pitch, and a graphitizing catalyst having an average diameter of 15 μm with silica and shaping the mixture, pulverizing the mixture, and carbonizing or graphitizing the resultant agglomerated amorphous particles to obtain a graphite agglomerated particles as the negative active material.

Comparative Example 5

A cell was prepared in the same manner as in Example 4, except that the negative active material was obtained by mixing carbonized coke particles, pitch, and a graphitizing catalyst with silica and shaping and pulverizing the mixture to an amorphous coarse body. Then, the amorphous particles were carbonized or graphitized by subjecting them to a high temperature treatment.

Comparative Example 6

A cell was prepared in the same manner as in Example 4, except that the negative active material was amorphous artificial graphite.

Mercury porosity of the negative active materials and the negative electrode plates according to Example 5 and Comparative Examples 4 to 6 were determined with a porosimeter (manufactured by Micrometics Inc.), and the results are shown in Table 2. Further, the cells obtained from Example 2 and Comparative Examples 1 to 3 were charged at 0.5 C at room temperature and discharged at 1 C at −20° C. to determine the discharge characteristics at low temperature. The discharge characteristics at low temperature shown in Table 2 are represented as the percent of discharge capacity at a low temperature based on the discharge capacity at room temperature. The results are shown in the following Table 2.

TABLE 2

|  | Example 5 | Comparative Example 4 | Comparative Example 5 | Comparative Example 6 |
| --- | --- | --- | --- | --- |
| Fine porosity (%) in active material particles having voids of 0.5 μm or less | 25 | 7.0 | 10 | 10 |
| Fine porosity (%) in electrode plate having voids of 0.5 μm or less | 27 | 23 | 36 | 12 |
| Porosity (%) occupied by voids of 10 to 100 μm | 58 | 24 | 25 | 50 |
| Discharge characteristic at low temperature of −20° C. | 60% | 30% | 40% | 60% |

As shown in Table 2, after compressing the negative electrodes according to Comparative Examples 4 and 5, it was found that the fine particles agglomerating to one particle were broken to generate fine voids while carbon particles uniformly dispersed inside of the particle were compressed, thereby, increasing the number of pores of 0.5 μm or less. Even though these voids had a fine porosity similar to that of Example 5, the obtained electrode plate did not have uniformity from compressing the active materials on the electrode plate, and consequently the electrolyte reaction was also not uniform, causing the life span of the electrode plate to be decreased. The 0.5 μm pores of the electrode plates according to Comparative Examples 4 and 5 were newly formed on the pulverized cracks derived from the compression process so that the edge faces of the graphite were exposed. Thereby, the side reaction was increased and the viscosity of the electrolyte was remarkably increased in an environment such as at −20° C. Therefore, it became difficult to generate a capillary phenomenon for the electrolyte in the fine cracks and it was difficult to cause the appropriate battery reaction. As a result, the discharge characteristics at low temperature degenerated. However, the electrode plate of Example 5 had good fine porosity of 0.5 μm or less of the active material and such fine porosity was well maintained. Further, the porosity of 10 to 100 μm is quite high so that the property of conserving electrolyte on the electrode plate according to Example 5 and the speed of transmitting the lithium ions was excellent so that the low temperature characteristics were shown to be quite good.

The negative active material of the present invention has a high density and good particle compression strength, and provides a high density electrode plate and a high capacity battery. The inventive negative electrode of the lithium secondary battery applies the negative active material having fine pores developed only on the surface thereof. Therefore, it is rarely broken during the compression process, maintaining the shape of the active material and preventing side reactions. It also imparts good swelling inhibition characteristics to the battery. Further, the cycle-life characteristic and low temperature discharge characteristic are improved.

What is claimed is:

1. A lithium secondary battery comprising a positive electrode comprising a positive active material, a negative electrode comprising a negative active material, and an electrolyte comprising a lithium salt and a non-aqueous solvent, wherein the negative active material comprises:
    a plurality of plate-shaped carbon powder particles agglomerated in a primary structure in which the plate-shaped carbon particles are oriented in a plane direction and laminated;

fine pores on the surface of the plate-shaped carbon powder particles;

a fine carbon particle powder agglomerated on the surface of plate-shaped carbon powder particles; and an amorphous carbon coating layer on a surface of the fine carbon particle powder, wherein the negative active material has a fine porosity of 10% to 40%, wherein the fine porosity corresponds to porosity of an area occupied by pores of 0.5 µm or less.

2. The lithium secondary battery of claim 1, wherein the negative active material has a compression strength of 15 MPa or more.

3. The lithium secondary battery of claim 1, wherein the negative active material has a fine porosity of 12% or less, wherein the fine porosity corresponds to porosity of an area occupied by pores of 0.1 µm or less.

4. The lithium secondary battery of claim 1, wherein the plate-shaped carbon powder particles are a natural or a synthetic graphite.

5. The lithium secondary battery of claim 1, wherein the plate-shaped carbon powder particles have an intensity ratio of the (110) plane and (002) plane of 0.2 or less according to X-ray diffraction analysis.

6. The lithium secondary battery of claim 1, wherein the fine carbon particle powder comprises fine graphite particles having a mean particle diameter of 5 µm.

7. The lithium secondary battery of claim 1, wherein the negative active material particles have a ratio of a major axis to a minor axis of 4 or less.

8. The lithium secondary battery of claim 1, wherein the negative active material has a tap density of 1.0 g/cc or more and an apparent density of 0.6 to 1.0 g/cc.

9. The lithium secondary battery of claim 1, wherein the tap density of the negative active material is 30% or more greater than the apparent density.

10. The lithium secondary battery of claim 1, wherein a specific surface area of the negative active material determined by the BET method is 2.0 $m^2/g$ to 4.0 $m^2/g$.

* * * * *

UNITED STATES PATENT AND TRADEMARK OFFICE
CERTIFICATE OF CORRECTION

PATENT NO. : 8,440,352 B2
APPLICATION NO. : 13/328888
DATED : May 14, 2013
INVENTOR(S) : Kyou-Yoon Sheem et al.

It is certified that error appears in the above-identified patent and that said Letters Patent is hereby corrected as shown below:

In the Claims

Column 12, Claim 8, line 11    After "secondary"
                                Insert -- battery --

Signed and Sealed this
Seventh Day of October, 2014

Michelle K. Lee
*Deputy Director of the United States Patent and Trademark Office*